(12) United States Patent
Choi et al.

(10) Patent No.: US 12,096,178 B2
(45) Date of Patent: Sep. 17, 2024

(54) ELECTRONIC DEVICE WITH RESONANCE STRUCTURE

(71) Applicant: Samsung Electronics Co., Ltd., Suwon-si (KR)

(72) Inventors: Byunggun Choi, Suwon-si (KR); Sangmin Ye, Suwon-si (KR); Sangmin Baek, Suwon-si (KR); Changi Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 233 days.

(21) Appl. No.: 17/817,305

(22) Filed: Aug. 3, 2022

(65) Prior Publication Data

US 2022/0417650 A1    Dec. 29, 2022

Related U.S. Application Data

(63) Continuation of application No. PCT/KR2022/007505, filed on May 26, 2022.

(30) Foreign Application Priority Data

Jun. 28, 2021    (KR) .................. 10-2021-0083619

(51) Int. Cl.
*H04R 1/28*    (2006.01)
*H04R 1/02*    (2006.01)

(52) U.S. Cl.
CPC .......... *H04R 1/2811* (2013.01); *H04R 1/025* (2013.01); *H04R 1/28* (2013.01); *H04R 1/2849* (2013.01);
(Continued)

(58) Field of Classification Search
CPC ........ H04R 1/025; H04R 1/28; H04R 1/2811; H04R 1/2849; H04R 1/2857; H04R 1/2888; H04R 2499/11; H04M 1/035; G06F 1/16

See application file for complete search history.

(56) References Cited

U.S. PATENT DOCUMENTS 5,261,006 A * 11/1993 Nieuwendijk ......... H04R 1/345
                                                      381/345
7,953,461 B2 * 5/2011 Fukazawa .............. H04R 1/225
                                                      455/575.1
(Continued)

FOREIGN PATENT DOCUMENTS

CN    111093128 A    5/2020
JP    H10-271195 A    10/1998
(Continued)

OTHER PUBLICATIONS

International Search Report dated Sep. 1, 2022 in connection with International Patent Application No. PCT/KR2022/007505, 3 pages.

*Primary Examiner* — Huyen D Le

(57)    ABSTRACT

In various example embodiments, an electronic device 300 may include: a housing 310 including a first housing 311 facing a first direction, and a second housing 312 facing a second direction opposite to the first direction; a sound module 340 disposed on a surface of the first housing 311 facing the second direction and configured to generate a sound; an acoustic duct 350 formed in the first housing 311 such that the sound module 340 and an outside of the electronic device 300 communicate with each other, and configured to transmit the sound generated by the sound module 340 to the outside of the electronic device 300; and a resonance structure 360 formed in the first housing 311 to
(Continued)

communicate with the acoustic duct 350 to tune a resonance characteristic according to a shape of the acoustic duct 350.

20 Claims, 9 Drawing Sheets

(52) U.S. Cl.
CPC ......... *H04R 1/2857* (2013.01); *H04R 1/2888* (2013.01); *H04R 2499/11* (2013.01)

(56) References Cited

U.S. PATENT DOCUMENTS

| | | |
|---|---|---|
| 9,479,850 B2 | 10/2016 | Lee et al. |
| 10,126,777 B2 | 11/2018 | Kim et al. |
| 10,178,455 B2 | 1/2019 | Moon et al. |
| 11,349,211 B2 | 5/2022 | Yeom et al. |
| 11,792,563 B2 * | 10/2023 | Kim .................. H04R 1/24 381/338 |
| 2017/0201817 A1 | 7/2017 | Moon et al. |
| 2017/0262018 A1 | 9/2017 | Kim et al. |
| 2019/0011392 A1 | 1/2019 | Mou et al. |
| 2021/0337055 A1 | 10/2021 | Lee et al. |

FOREIGN PATENT DOCUMENTS

| | | |
|---|---|---|
| JP | 2008-181365 A | 8/2008 |
| KR | 10-2013-0015319 A | 2/2013 |
| KR | 10-2014-0004875 A | 1/2014 |
| KR | 10-2015-0004643 A | 1/2015 |
| KR | 10-2017-0006075 A | 1/2017 |
| KR | 10-2017-0084444 A | 7/2017 |
| KR | 10-2023189 B1 | 7/2017 |
| KR | 10-1829835 B1 | 9/2017 |
| KR | 10-1991504 B1 | 9/2019 |
| KR | 10-2020-0085069 A | 7/2020 |
| KR | 10-2021-0012320 A | 2/2021 |

* cited by examiner

ELECTRONIC DEVICE WITH RESONANCE STRUCTURE

CROSS-REFERENCE TO RELATED APPLICATIONS

This application is a Bypass Continuation of International Application No. PCT/KR2022/007505, filed May 26, 2022, which claims priority to Korean Patent Application No. 10-2021-0083619, filed Jun. 28, 2021, the disclosures of which are incorporated by reference herein in their entireties.

BACKGROUND

1. Field

The following disclosure relates to an electronic device with a resonance structure.

2. Description of Related Art

At least one speaker device for outputting sound may be mounted inside a housing of an electronic device. In addition, high-density component mounting structures have been applied to mount components having various functions in a miniaturized electronic device. In such a high-density component mounting structure, designing an acoustic duct for emitting sound from the speaker device to the outside of the electronic device may be limited.

SUMMARY

A resonance phenomenon may occur depending on a shape of an acoustic duct formed in an electronic device, which may lead to a degradation in acoustic performance. For example, when a resonant frequency of the acoustic duct overlaps a peak or a valley on an equal-loudness contour, a phenomenon, in which a corresponding sound range is prominently represented abnormally or a noise level of the corresponding sound range is noticeable, may occur. In addition, for example, if a level of the resonant frequency is remarkably different from a level of another sound band, a filter may be excessively used to correct such a difference. If sufficient correction by the filter is not achieved, the sound quality may be extremely degraded.

According to various example embodiments, a resonance characteristic generated according to a shape of an acoustic duct may be tuned.

According to various example embodiments, a position of a resonant frequency may be adjusted, or a level at the resonant frequency may be adjusted.

According to various example embodiments, a sound quality may be enhanced and improved.

In various example embodiments, an electronic device 300 may include: a housing 310 including a first housing 311 facing a first direction, and a second housing 312 facing a second direction opposite to the first direction; a sound module 340 disposed on a surface of the first housing 311 facing the second direction and configured to generate a sound; an acoustic duct 350 formed in the first housing 311 such that the sound module 340 and an outside of the electronic device 300 communicate with each other, and configured to transmit the sound generated by the sound module 340 to the outside of the electronic device 300; and a resonance structure 360 formed in the first housing 311 to communicate with the acoustic duct 350 to tune a resonance characteristic according to a shape of the acoustic duct 350.

In various example embodiments, an electronic device 300 may include: a housing 310 including a first housing 311 facing a front surface of the electronic device 300, and a second housing 312 facing a rear surface of the electronic device 300; a sound module 340 disposed on a rear surface of the first housing 311 and configured to generate a sound; an acoustic duct 350 formed in the first housing 311 to emit the sound generated by the sound module 340 to the front surface; and a resonance structure 360 formed in the first housing 311 to communicate with the acoustic duct 350 to tune a resonance characteristic according to a shape of the acoustic duct 350.

In various example embodiments, an electronic device 300 may include: a housing 310 including a first housing 311 facing a first direction, and a second housing 312 facing a second direction opposite to the first direction; a sound module 340 disposed on a surface of the first housing 311 facing the second direction and configured to generate a sound; an acoustic duct 350 formed in the first housing 311 such that the sound module 340 and an outside of the electronic device 300 communicate with each other, and configured to transmit the sound generated by the sound module 340 to the outside of the electronic device 300; and a resonance structure 360 formed in the first housing 311 to communicate with the acoustic duct 350 to tune a resonance characteristic according to a shape of the acoustic duct 350. The resonance structure 360 may include: a resonance space 361 formed in the first housing 311; and an inlet duct 362 formed in the first housing 311 to allow the resonance space 361 to communicate with the acoustic duct 350. The first housing 311 may be segmented into a plurality of portions, and a portion of the first housing 311 in which the resonance structure 360 is formed may function as an antenna. A resonance characteristic of the acoustic duct 350 may be tuned by adjusting at least one of a volume of the resonance space 361, a cross-sectional area of the inlet duct 362, and a length of the inlet duct 362.

According to various example embodiments, it is possible to tune a resonance characteristic generated according to a shape of an acoustic duct by applying a resonance structure.

According to various example embodiments, it is possible to adjust a position of a resonant frequency, or a level at the resonant frequency by adjusting a shape of a resonance structure.

According to various example embodiments, it is possible to enhance and improve a sound quality.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
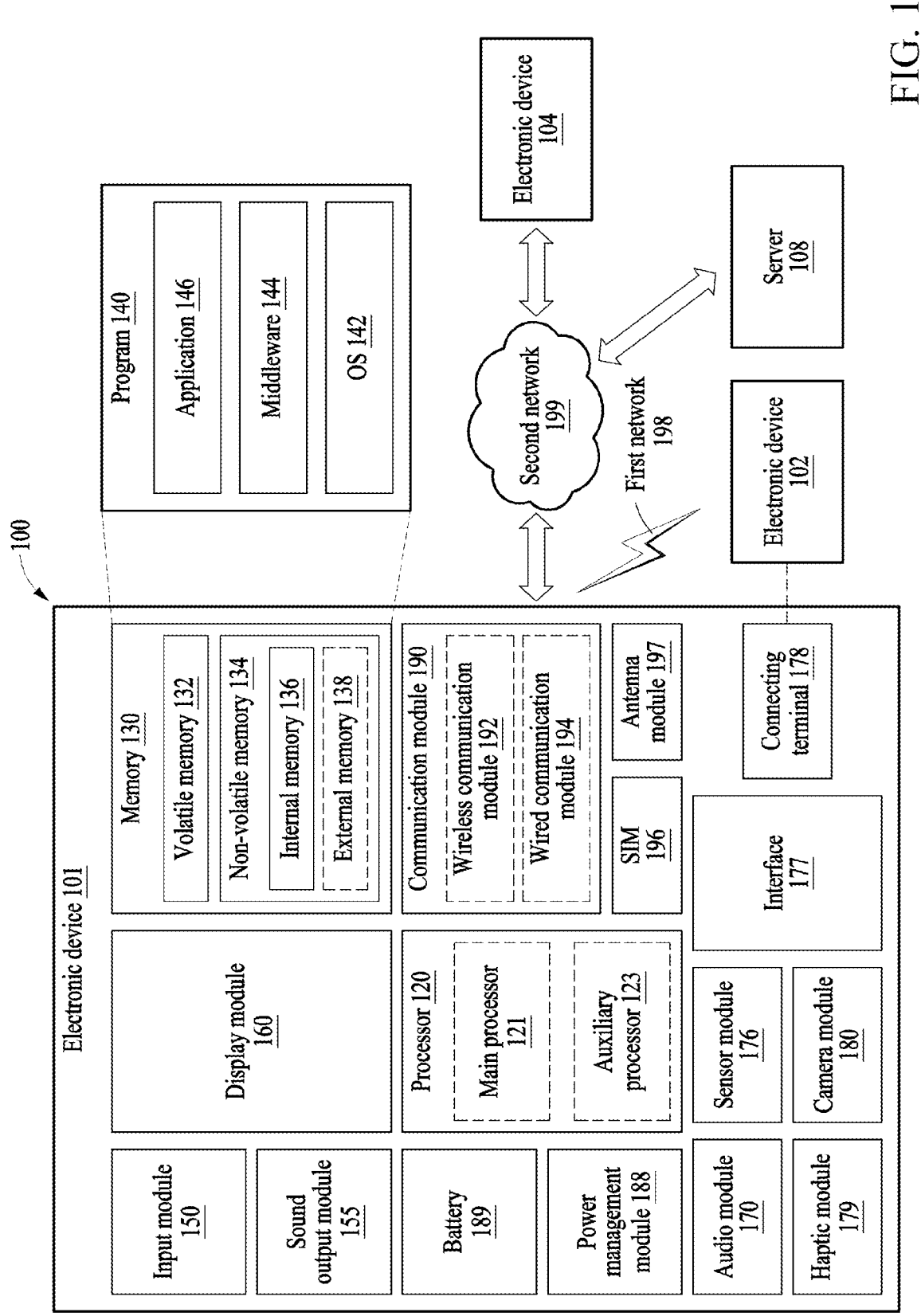
FIG. 1 illustrates a block diagram illustrating an electronic device in a network environment according to various example embodiments.

FIGS. 1 through 4B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, example embodiments will be described in detail with reference to the accompanying drawings. When describing the example embodiments with reference to the accompanying drawings, like reference numerals refer to like elements and a repeated description related thereto will be omitted.

FIG. 1 illustrates a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to some embodiments, the electronic device 101 may communicate with the electronic device 104 via the server 108. According to some embodiments, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to some embodiments, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to some embodiments, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to some embodiments, the auxiliary processor 123 (e.g., an ISP or a CP) may be implemented as a portion of another component (e.g., the camera module 180 or the communication module 190) that is functionally related to the auxiliary processor 123. According to some embodiments, the auxiliary processor 123 (e.g., an NPU) may include a hardware structure specified for artificial intelligence (AI) model processing. An AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to some embodiments, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to some embodiments, the display module 160 may include a touch sensor adapted to sense a touch, or a pressure sensor adapted to measure an intensity of a force incurred by the touch.

The audio module 170 may convert a sound into an electric signal or vice versa. According to some embodiments, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to some embodiments, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to some embodiments, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to some embodiments, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to some embodiments, the haptic module 179 may include, for example, a motor, a piezoelectric element, or an electric stimulator.

The camera module 180 may capture a still image and moving images. According to some embodiments, the camera module 180 may include one or more lenses, image sensors, ISPs, or flashes.

The power management module 188 may manage power supplied to the electronic device 101. According to some embodiments, the power management module 188 may be implemented as, for example, at least a part of a power management integrated circuit (PMIC).

The battery 189 may supply power to at least one component of the electronic device 101. According to some embodiments, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to some embodiments, the communication module 190 may include a wireless communication module 192 (e.g., a cellular communication module, a short-range wireless communication module, or a global navigation satellite system (GNSS) communication module) or a wired communication module 194 (e.g., a local region network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide region network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to some embodiments, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to some embodiments, the antenna module 197 may include an antenna including a radiating element including a conductive material or a conductive pattern formed in or on a substrate (e.g., a printed circuit board (PCB)). According to some embodiments, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to some embodiments, another component (e.g., a radio frequency integrated circuit (RFIC)) other than the radiating element may be additionally formed as a part of the antenna module 197.

According to various example embodiments, the antenna module 197 may form a mmWave antenna module. According to some embodiments, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to some embodiments, commands or data may be transmitted or received between the electronic device 101 and the external electronic device 104 via the server 108 coupled with the second network 199. Each of the external electronic devices 102 or 104 may be a device of the same type as or a different type from the electronic device 101. According to some embodiments, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning or a neural network. According to some embodiments, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
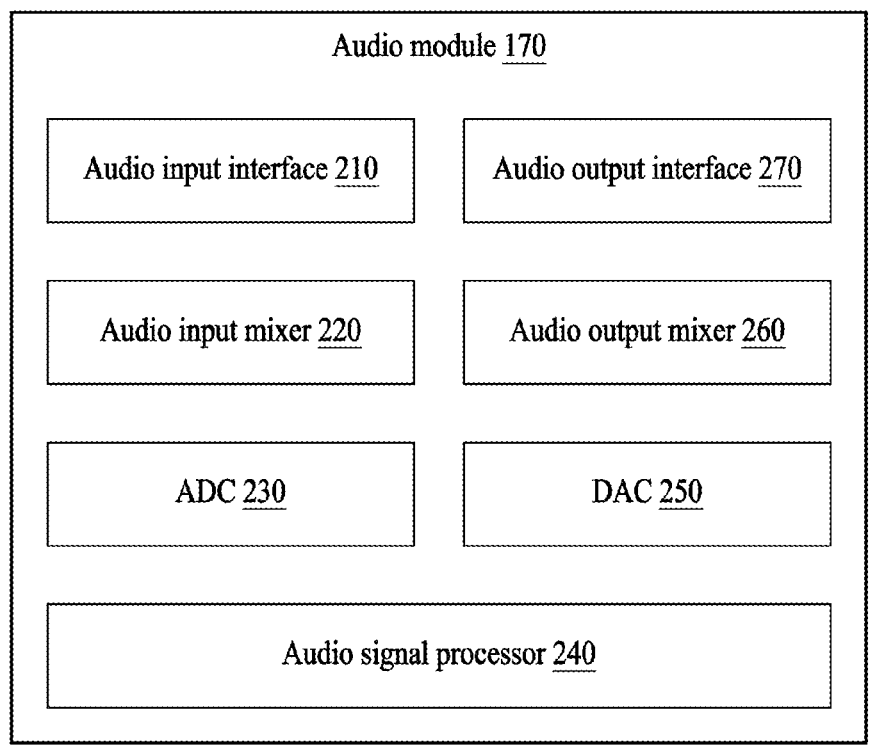
FIG. 2 illustrates a block diagram of an audio module according to various example embodiments.

FIG. 2 illustrates a block diagram 200 of an audio module 170 according to various example embodiments. Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to some embodiments, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to some embodiments, additionally or alternatively, the audio input interface 210 may receive an audio signal from another component (e.g., the processor 120 or the memory 130) of the electronic device 101.

The audio input mixer 220 may synthesize a plurality of input audio signals into at least one audio signal. For example, according to some embodiments, the audio input mixer 220 may synthesize a plurality of analog audio signals input via the audio input interface 210 into at least one analog audio signal.

The ADC 230 may convert an analog audio signal into a digital audio signal. For example, according to some embodiments, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to some embodiments, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to some embodiments, one or more functions of the audio signal processor 240 may be implemented in the form of an equalizer.

The DAC 250 may convert a digital audio signal into an analog audio signal. For example, according to some embodiments, the DAC 250 may convert a digital audio signal processed by the audio signal processor 240 or a digital audio signal obtained from another component (e.g., the processor 120 or the memory 130) of the electronic device 101 into an analog audio signal.

The audio output mixer 260 may synthesize a plurality of audio signals, which are to be output, into at least one audio signal. For example, according to some embodiments, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, or a receiver. According to some embodiments, the sound output module 155 may include a plurality of speakers. In such a case, the audio output interface 270 may output audio signals having a plurality of different channels (e.g., stereo channels or 5.1 channels) via at least some of the plurality of speakers. According to some embodiments, the audio output interface 270 may be connected with the external electronic device 102 (e.g., an external speaker or a headset) directly via the connecting terminal 178 or wirelessly via the wireless communication module 192 to output an audio signal.

According to some embodiments, the audio module 170 may generate, without separately including the audio input mixer 220 or the audio output mixer 260, at least one digital audio signal by synthesizing a plurality of digital audio signals using at least one function of the audio signal processor 240.

According to some embodiments, the audio module 170 may include an audio amplifier (not shown) (e.g., a speaker amplifying circuit) that is capable of amplifying an analog audio signal input via the audio input interface 210 or an audio signal that is to be output via the audio output interface 270. According to some embodiments, the audio amplifier may be configured as a module separate from the audio module 170.

Figure 3A:
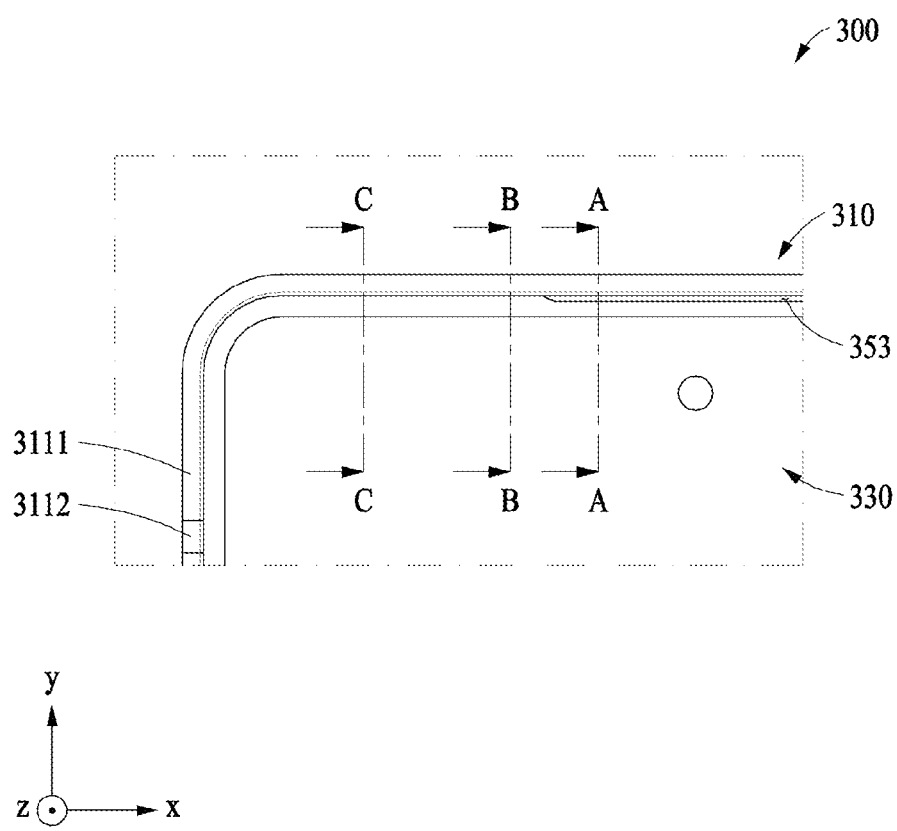
FIG. 3A illustrates a diagram illustrating a portion of a front surface of an electronic device according to an example embodiment.
Figure 3B:
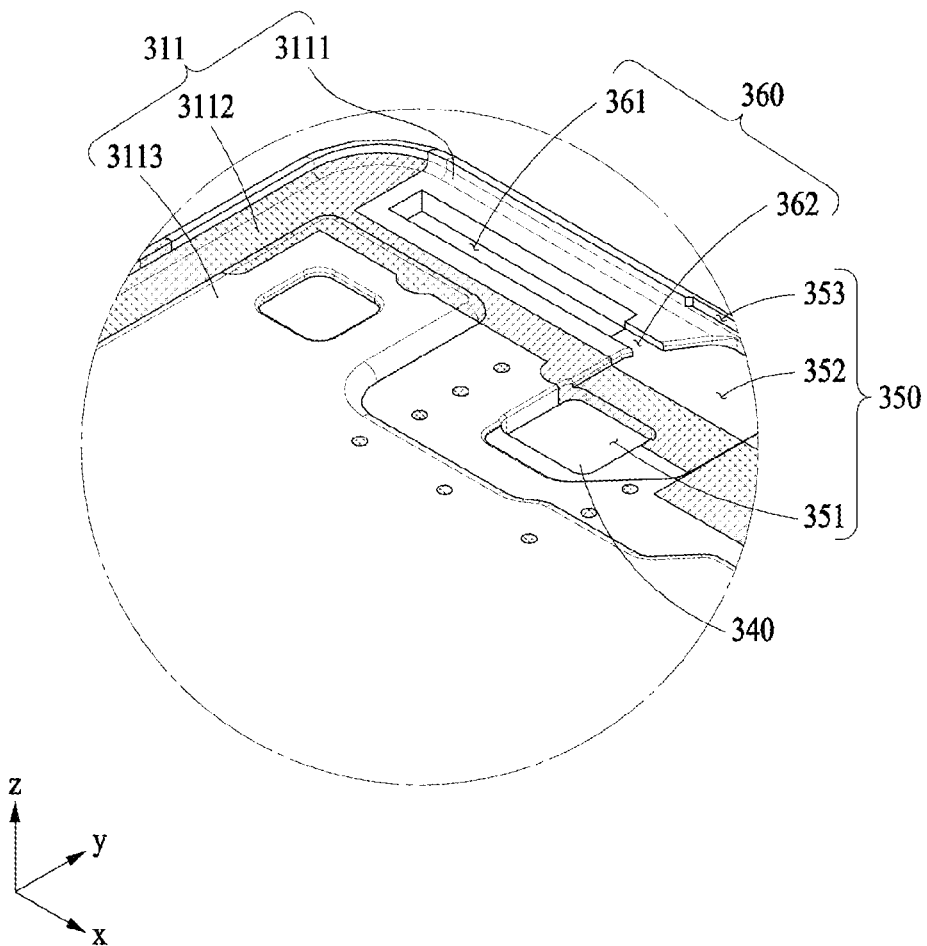
FIG. 3B illustrates a perspective view illustrating a resonance structure according to an example embodiment.
Figure 3C:
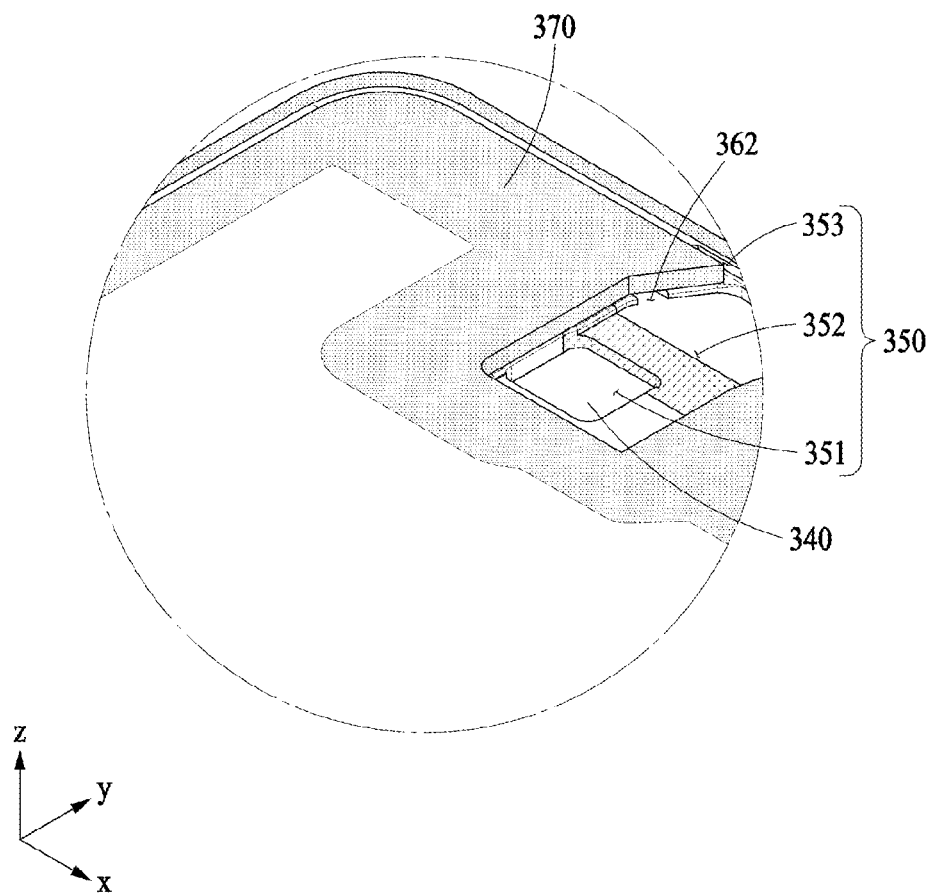
FIG. 3C illustrates a perspective view illustrating a state in which a resonance structure according to an example embodiment is covered by a counterpart structure.
Figure 3D:
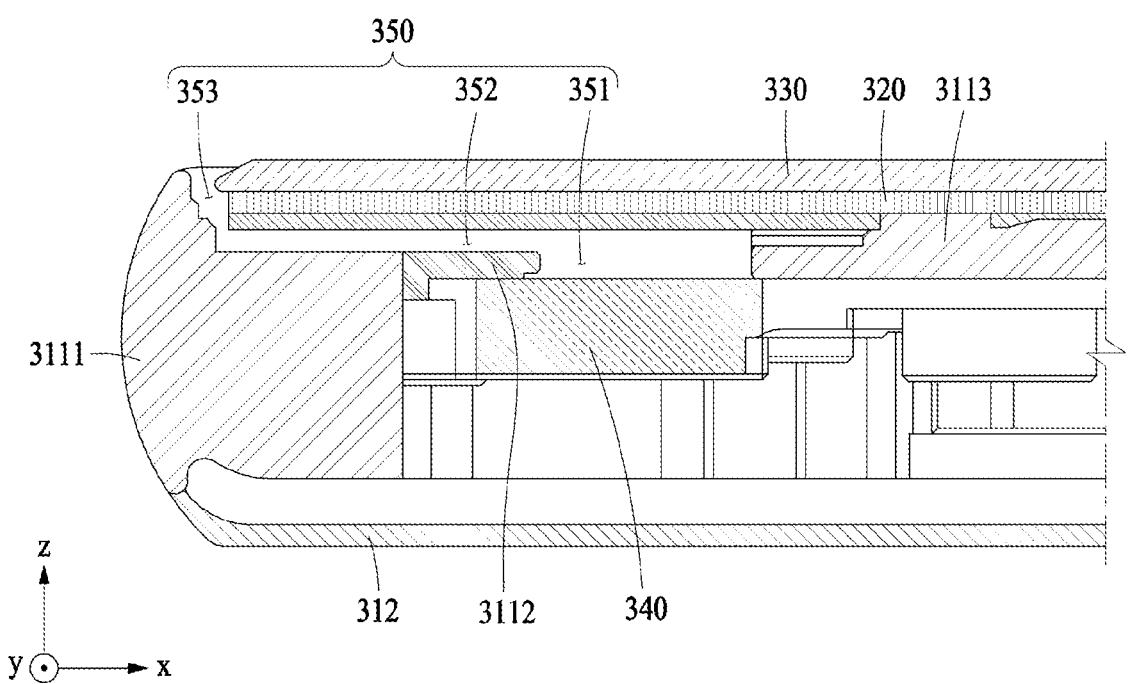
FIG. 3D illustrates a cross-sectional view taken along line A-A of FIG. 3A.
Figure 3E:
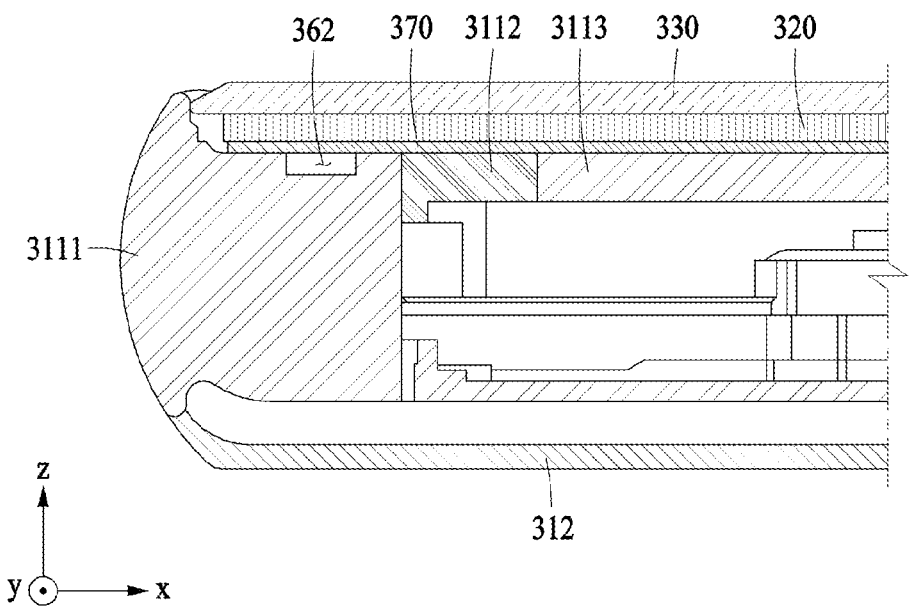
FIG. 3E illustrates a cross-sectional view taken along line B-B of FIG. 3A.
Figure 3F:
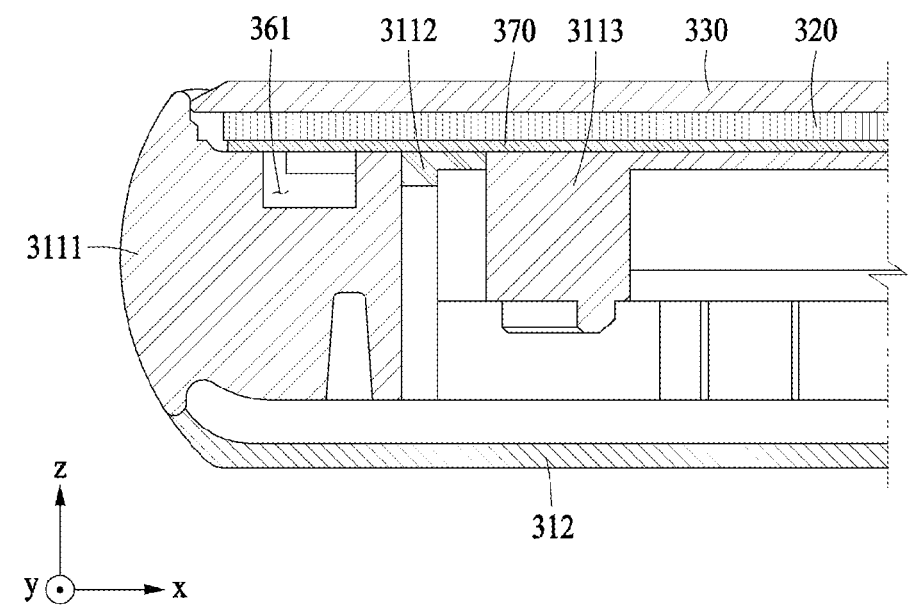
FIG. 3F illustrates a cross-sectional view taken along line C-C of FIG. 3A.

FIG. 3A illustrates a diagram illustrating a portion of a front surface of an electronic device according to an example embodiment. FIG. 3B illustrates a perspective view illustrating a resonance structure according to an example embodiment. FIG. 3C illustrates a perspective view illustrating a state in which a resonance structure according to an example embodiment is covered by a counterpart structure. FIG. 3D illustrates a cross-sectional view taken along line A-A of FIG. 3A. FIG. 3E illustrates a cross-sectional view taken along line B-B of FIG. 3A. FIG. 3F illustrates a cross-sectional view taken along line C-C of FIG. 3A.

Referring to FIGS. 3A to 3F, an electronic device 300 (e.g., the electronic device 101 of FIG. 1) according to some embodiments may include a housing 310, a display 320, a window 330, a sound module 340, an acoustic duct 350, a resonance structure 360, and a counterpart structure 370.

In some embodiments, the housing 310 may form an exterior of the electronic device 300. The housing 310 may include a first housing 311 and a second housing 312. The first housing 311 may be disposed to face a first direction (e.g., a +z-axis direction). For example, the first direction may be a direction toward a front surface of the electronic device 300. The second housing 312 may be disposed to face a second direction (e.g., a −z-axis direction) opposite to the first direction. For example, the second direction may be a direction toward a rear surface of the electronic device 300. A space for mounting components may be formed between the first housing 311 and the second housing 312. The housing 310 may further include a side bezel enclosing the space between the first housing 311 and the second housing 312. As shown in FIGS. 3D to 3F, the side bezel may also be formed integrally with the first housing 311. However, this is merely an example, and the configuration of the housing 310 is not limited thereto. For example, the side bezel may be formed as a separate component, or may be formed integrally with the second housing 312.

In some embodiments, the first housing 311 may be segmented into a plurality of portions. At least a portion of the first housing 311 may be formed as a metal portion to function as an antenna. For example, the first housing 311 may include a first metal portion 3111, a non-metal portion 3112, and a second metal portion 3113. At least a portion of the first metal portion 3111 may be exposed to the outside of the electronic device 300. The first metal portion 3111 may be exposed to the outside and function as an antenna. For example, the first metal portion 3111 may form an edge portion of the electronic device 300. The first metal portion 3111 may be formed to extend inwardly from an edge portion of the electronic device 300 by a designated width.

For example, in FIG. 3B, at least a portion of the first metal portion 3111 may form an upper edge (e.g., an end portion facing a +y-axis direction) of the electronic device 300, and may extend from the upper edge (e.g., the end portion facing the +y-axis direction) in an inward direction (e.g., a −y-axis direction) by a designated width. The second metal portion 3113 may be formed in an inner portion of the electronic device 300 inward from the first metal portion 3111. The second metal portion 3113 may be a portion on which various components are disposed. The non-metal portion 3112 may be formed between the first metal portion 3111 and the second metal portion 3113 to separate the first metal portion 3111 and the second metal portion 3113 from each other. The non-metal portion 3112 may have insulating properties or non-conductivity properties. For example, the non-metal portion 3112 may be formed through an injection process. At least a portion of the non-metal portion 3112 may be exposed as an edge portion of the electronic device 300. The non-metal portion 3112 exposed as the edge portion may separate an edge portion of the first metal portion 3111 from another metal portion (e.g., the second metal portion 3113). Since the first metal portion 3111 is isolated from the other metal portion (e.g., the second metal portion 3113) by the non-metal portion 3112, the antenna performance of the first metal portion 3111 may be enhanced. The first metal portion 3111, the non-metal portion 3112, or the second metal portion 3113 may be integrally formed. Shapes, positions, and sizes of the first metal portion 3111, the non-metal portion 3112, and the second metal portion 3113 shown in FIG. 3B are merely examples, and the example embodiments are not limited thereto.

In some embodiments, the display 320 (e.g., the display module 160 of FIG. 1) may provide visual information to the outside of the electronic device 300. The display 320 may be disposed on a surface (e.g., a front surface) of the first housing 311 facing the first direction (e.g., the +z-axis direction). The window 330 may be disposed on a surface (e.g., a front surface) of the display 320 facing the first direction (e.g., the +z-axis direction). The window 330 may at least partially include a transparent area. The display 320 may be exposed to the outside through the window 330.

In some embodiments, the sound module 340 (e.g., the audio module 170 of FIG. 1) may generate a sound according to an electric signal, or convert the sound into an electric signal. For example, the sound module 340 may include a sound module housing, at least one magnetic member disposed in an inner space of the sound module housing, a coil member (e.g., a voice coil) disposed at a position affected by a magnetic force of the at least one magnetic member, and a vibrating member that is at least partially fixed to the sound module housing to vibrate according to a movement of the coil member. However, this is merely an example, and a configuration of the sound module 340 is not limited thereto.

In some embodiments, the sound module 340 may be disposed in the space between the first housing 311 and the second housing 312. For example, the sound module 340 may be disposed on a surface (e.g., a rear surface) of the first housing 311 facing the second direction (e.g., the −z-axis direction). A mounting portion for mounting the sound module 340 may be formed in the first housing 311. For example, the sound module 340 may be mounted on the first housing 311 through a support structure (not shown).

In some embodiments, the sound generated by the sound module 340 may be transmitted to the outside of the electronic device 300 through the acoustic duct 350. The acoustic duct 350 may be a path through which the sound module 340 communicates with the outside of the electronic device 300. The acoustic duct 350 may be formed in the first housing 311. For example, the acoustic duct 350 may be formed on the surface (e.g., the front surface) of the first housing 311 facing the first direction (e.g., the +z-axis direction). The sound generated by the sound module 340 may be emitted in the first direction (e.g., the +z-axis direction) through the acoustic duct 350.

In some embodiments, the acoustic duct 350 may include a through-hole 351, a connection space 352, and a sound hole 353.

In some embodiments, the through-hole 351 may be formed to penetrate the first housing 311 in forward and backward directions (e.g., a z-axis direction). The sound module 340 may be disposed in a rear direction (e.g., a −z-axis direction) of the through-hole 351. For example, a portion of the sound module 340 from which sound is emitted may be exposed through the through-hole 351. To prevent sound from leaking from a gap between portions in which the first housing 311 and the sound module 340 are connected, a sealing member (not shown) may be interposed between the first housing 311 and the sound module 340 along a periphery of the through-hole 351.

In some embodiments, the connection space 352 may be a space formed by forming a stepped portion in the forward and backward directions (e.g., the z-axis direction) in the first housing 311. For example, the connection space 352 may be formed by recessing a portion of the surface (e.g., the front surface) of the first housing facing the first direction (e.g., the +z-axis direction) in the second direction (e.g., the −z-axis direction). The connection space 352 may be formed at a position that communicates with the through-hole 351. In addition, the connection space 352 may communicate with the sound hole 353 that will be described below. One side of the connection space 352 may communicate with the through-hole 351, and another side may communicate with the sound hole 353. In other words, the connection space 352 may be a space through which the through-hole 351 and the sound hole 353 communicate with each other. For example, the connection space 352 may be formed in an x-y plane direction, to allow the through-hole 351 and the sound hole 353 to communicate with each other. For example, a cross-sectional area of the connection space 352 may be greater than a cross-sectional area of the through-hole 351, when the first housing 311 is viewed from the front side.

In some embodiments, the sound hole 353 may be a hole through which the connection space 352 communicates with the outside of the electronic device 300. For example, the sound hole 353 may be formed on the surface (e.g., the front surface) of the first housing 311 facing the first direction (e.g., the +z-axis direction). For example, the sound hole 353 may be formed by forming a notch in an edge portion (e.g., a side bezel portion) of the first housing 311. The notch formed on the edge portion of the first housing 311 may be spaced apart from the display 320 and the window 330, and the sound hole 353 may be formed therebetween. However, this is merely an example, and a structure or location in which the sound hole 353 is formed is not limited thereto. For example, the sound hole 353 may also be formed to penetrate the first housing 311 in the forward and backward directions (e.g., the z-axis direction) or in a lateral direction (e.g., the x-axis direction or y-axis direction).

In some embodiments, the sound generated by the sound module 340 may be emitted to the outside of the electronic device 300 through the acoustic duct 350. For example, the sound generated by the sound module 340 may be emitted to the outside of the electronic device 300 through the through-hole 351, the connection space 352, and the sound hole 353. The acoustic duct 350 including the through-hole 351, the connection space 352, and the sound hole 353, and formed on the front surface of the first housing 311 has been described based on the drawings and detailed description, however, this is merely an example. A shape, a size, a structure, or a position of the acoustic duct 350 are not limited thereto. For example, the acoustic duct 350 may be formed in the second housing 312 or the side bezel, or a plurality of acoustic ducts may be formed.

In some embodiments, the resonance structure 360 may be formed in the first housing 311 to communicate with the acoustic duct 350, to tune a resonance characteristic according to the shape of the acoustic duct 350. Herein, the resonance characteristic may refer to a characteristic related to a resonance phenomenon. For example, the resonance characteristic may refer to at least a position of a resonant frequency, an intensity of a level at the resonant frequency, or a difference in intensity between the level at the resonant frequency and a level at F0. For example, the resonance structure 360 may be formed as a Helmholtz resonator structure.

In some embodiments, the resonance structure 360 may be formed in a portion that functions as an antenna in the first housing 311. For example, the resonance structure 360 may be formed in the first metal portion 3111. The first metal portion 3111 may be an area in which other components are not generally disposed to prevent a degradation in antenna performance. Therefore, it may be suitable to form the resonance structure 360 in the first metal portion 3111 of the first housing 311, and it is possible to easily form the resonance structure 360 while maintaining a high-density component mounting structure.

In some embodiments, the resonance structure 360 may include a resonance space 361 and an inlet duct 362.

In some embodiments, the resonance space 361 may be formed in the first housing 311. The inlet duct 362 may be formed in the first housing 311 to allow the resonance space 361 to communicate with the acoustic duct 350. The resonance space 361 may be formed such that portions other than a portion communicating with the inlet duct 362 may be closed. The resonance space 361 may be formed to have a designated volume. For example, the inlet duct 362 may allow the connection space 352 of the acoustic duct 350 to communicate with the resonance space 361. The inlet duct 362 may be formed such that portions other than a portion communicating with the resonance space 361 and the acoustic duct 350 may be closed. For example, the inlet duct 362 may be formed in a longitudinal direction.

In some embodiments, a volume of the resonance space 361 may be greater than a volume of the inlet duct 362. A longitudinal length of the resonance space 361 may be greater than a longitudinal length of the inlet duct 362. A cross-sectional area of the resonance space 361 may be greater than a cross-sectional area of the inlet duct 362. Herein, the cross-sectional area of each of the resonance space 361 and the inlet duct 362 may refer to a cross-sectional area of a surface perpendicular to the longitudinal direction. For example, if the resonance space 361 and the inlet duct 362 are formed in a longitudinal direction (e.g., the x-axis direction), the cross-sectional area of the resonance space 361 and the inlet duct 362 may refer to a cross-sectional area of a y-z plane. Based on the above structure, the resonance structure 360 may tune a resonance characteristic of the acoustic duct 350 by adjusting at least one of the volume of the resonance space 361, the cross-sectional area of the inlet duct 362, and the length of the inlet duct 362. For example, the volume of the resonance space 361, the cross-sectional area of the inlet duct 362, and the length of the inlet duct 362 may be designed based on a resonant frequency calculation equation $$f = \frac{c}{2\pi}\sqrt{\frac{A}{Vl}}$$

of a Helmholtz resonator. In the resonant frequency calculation equation, c denotes a velocity of sound, V denotes the volume of the resonance space 361, A denotes the cross-sectional area of the inlet duct 362, and l denotes the length of the inlet duct 362. At least one of the volume of the resonance space 361, the cross-sectional area of the inlet duct 362, and the length of the inlet duct 362 may be adjusted as necessary to express a desired resonance characteristic.

In some embodiments, the resonance structure 360 may be formed such that at least one surface thereof may be opened. For example, the resonance space 361 or the inlet duct 362 may be formed by recessing a portion of the surface (e.g., the front surface) of the first housing 311 facing the first direction (e.g., the +z-axis direction) in the second direction (e.g., the −z-axis direction). In this example, a depth at which the resonance space 361 is recessed may be greater than a depth at which the inlet duct 362 is recessed. Based on the above structure, a surface (e.g., a front surface) of the resonance structure 360 facing the first direction (e.g., the +z-axis direction) may be opened. The opened surface of the resonance structure 360 may be covered by the counterpart structure 370. In other words, the counterpart structure 370 may be disposed on the surface (e.g., the front surface) of the first housing 311 facing the first direction (e.g., the +z-axis direction) to cover the opened surface of the resonance structure 360. Herein, the counterpart structure 370 may refer to an arbitrary structure for closing the opened surface of the resonance structure 360. For example, the counterpart structure 370 may include at least one of the display 320, a waterproof tape, a film member, an adhesive member, an injection member, a metal member. As a particular example, FIG. 3C illustrates an example in which the counterpart structure 370 is a waterproof tape. However, the type of the counterpart structure 370 is not limited thereto. In some embodiments, the resonance structure 360 may also be formed to penetrate the first housing 311 such that both a front surface and a rear surface of the resonance structure 360 may be opened. In this example, the counterpart structure 370 may be disposed on each of the front surface and the rear surface of the resonance structure 360.

In some embodiments, the volume of the resonance space 361 or the cross-sectional area of the inlet duct 362 may be adjusted by a stepped portion of the counterpart structure 370. For example, if the counterpart structure 370 is disposed on a surface (e.g., a front surface) of the resonance structure 360 facing the first direction (e.g., the +z-axis direction), a stepped portion may be formed in the first direction (e.g., the +z-axis direction) or the second direction (e.g., the −z-axis direction) on a surface (e.g., a rear surface) of the counterpart structure 370 facing the second direction (e.g., the −z-axis direction). For example, a stepped portion may be formed in the first direction (e.g., the +z-axis direction) in at least a portion of an area of the counterpart structure 370 covering the resonance space 361, to increase the volume of the resonance space 361. Alternatively, a stepped portion may be formed in the second direction (e.g., the −z-axis direction) in at least a portion of the area of the counterpart structure 370 covering the resonance space 361, to reduce the volume of the resonance space 361. Similarly, a stepped portion may be formed in the first direction (e.g., the +z-axis direction) in at least a portion of an area of the counterpart structure 370 covering the inlet duct 362, to increase the cross-sectional area of the inlet duct 362. Alternatively, a stepped portion may be formed in the second direction (e.g., the −z-axis direction) in at least a portion of the area of the counterpart structure 370 covering the inlet duct 362, to reduce the cross-sectional area of the inlet duct 362.

In some embodiments, the length of the inlet duct 362 may be adjusted by an arrangement position of the counterpart structure 370. A degree to which the counterpart structure 370 covers the inlet duct 362 may be adjusted, and accordingly a length of a closed portion of the inlet duct 362 may be adjusted. For example, if the inlet duct 362 is formed in the longitudinal direction (e.g., the x-axis direction), a degree to which the counterpart structure 370 covers the inlet duct 362 in the longitudinal direction may increase, thereby increasing the length of the closed portion of the inlet duct 362. Alternatively, the degree to which the counterpart structure 370 covers the inlet duct 362 in the longitudinal direction may be reduced, thereby reducing the length of the closed portion of the inlet duct 362. As a result, the length of the inlet duct 362 may be adjusted by adjusting the degree to which the counterpart structure 370 covers the inlet duct 362.

In some embodiments, the resonance structure 360 may also be formed inside the first housing 311. For example, the resonance structure 360 may be formed by carving the first housing 311. In this example, portions of the resonance structure 360 other than a portion communicating with the acoustic duct 350 may all be closed. Accordingly, the resonance structure 360 may be closed by only the first housing 311 even though there is no separate counterpart structure for closing the resonance structure 360.

In some embodiments, the resonance structure 360 may be formed in the longitudinal direction. For example, the resonance space 361 and the inlet duct 362 may be formed in the longitudinal direction (e.g., the x-axis direction) parallel to a periphery of the electronic device 300. However, this is merely an example, and the resonance space 361 and the inlet duct 362 may be formed with various shapes. For example, the resonance space 361 may also be curved to have lengths in the x-axis direction and the y-axis direction.

In the description and illustration of the acoustic duct 350 and the resonance structure 360, sound is emitted through the front surface of the electronic device 300, however, this is merely an example, and a position of each of the acoustic duct 350 and the resonance structure 360 is not limited thereto. For example, if the acoustic duct 350 is formed in the second housing 312, the resonance structure 360 may be formed in the second housing 312. If the acoustic duct 350 is formed in the side bezel, the resonance structure 360 may be formed in the side bezel.

Figure 4A:
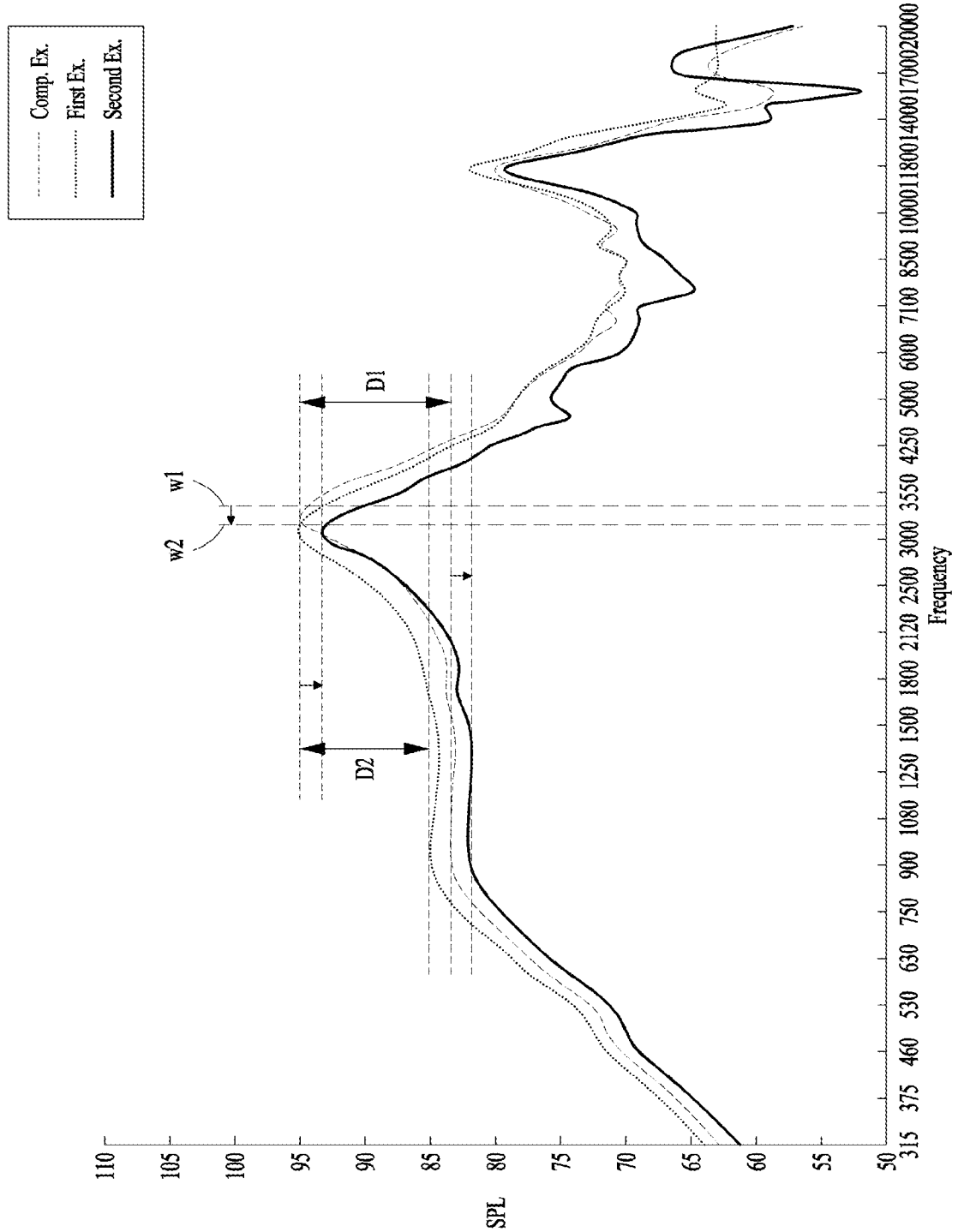
FIG. 4A illustrates a graph illustrating results of a sound frequency test for an electronic device according to example embodiments and an electronic device according to a comparative example embodiment.
Figure 4B:
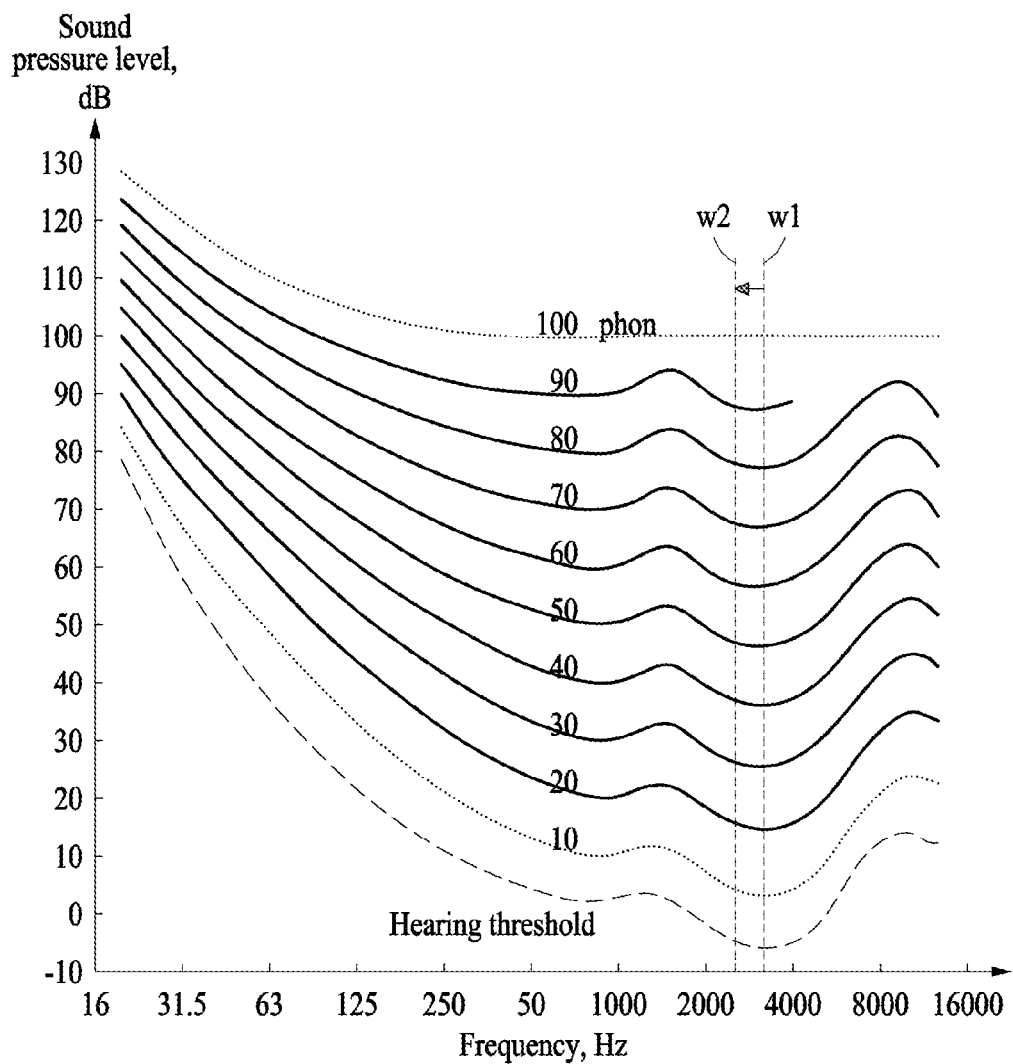
FIG. 4B illustrates a graph illustrating equal-loudness contours indicating positions of resonant frequencies in an electronic device according to an example embodiment and an electronic device according to a comparative example embodiment.

FIG. 4A illustrates a graph illustrating results of a sound frequency test for an electronic device according to example embodiments and an electronic device according to a comparative example embodiment. FIG. 4B illustrates a graph illustrating equal-loudness contours indicating positions of resonant frequencies in an electronic device according to an example embodiment and an electronic device according to a comparative example embodiment. The electronic device according to the comparative example embodiment may be an electronic device in which a resonance structure is not formed.

In FIG. 4A, experimental data for an electronic device to which a resonance structure according to a first example embodiment is applied is indicated by a dotted line, experimental data for an electronic device to which a resonance structure according to a second example embodiment is applied is indicated by a solid line, and experimental data for the electronic device according to the comparative example embodiment is indicated by a dashed line.

Referring to FIGS. 4A and 4B, it can be confirmed that the position of the resonant frequency is changed from w1 to w2 when the first example embodiment and the comparative example embodiment are compared. In the comparative example embodiment, since the resonant frequency w1 corresponds to a valley on the equal-loudness contour, a phenomenon, in which a corresponding sound range is prominently represented abnormally or a noise level of the corresponding sound range is noticeable, may occur. However, in the first example embodiment, by forming a resonance structure (e.g., the resonance structure 360 of FIG. 3B), the position of the resonant frequency may be changed to w2 to prevent the resonant frequency from overlapping a peak or valley on the equal-loudness contour. As a result, it is possible to change the position of the resonant frequency by forming the resonance structure 360 having an appropriate shape. In addition, it is possible to prevent an occurrence of acoustic distortion caused by a resonant frequency corresponding to a peak or a valley on the equal-loudness contour.

Referring to FIG. 4A, it can be confirmed that a difference in intensity between a level at the resonant frequency and a level at F0 is D1 in the comparative example embodiment, but is reduced to D2 in the first example embodiment. In other words, it is possible to reduce a difference between the level at the resonant frequency and a level at another sound band by forming the resonance structure 360 having the appropriate shape, thereby lowering a filter dependence and increasing a degree of freedom in gain tuning. Thus, sound performance may be enhanced.

Referring to FIG. 4A, it can be confirmed that the position of the resonant frequency is changed, and that both the level at the resonant frequency and the level at F0 are reduced when the second example embodiment and the comparative example embodiment are compared. In other words, it can be confirmed that by forming the resonance structure 360 having the appropriate shape, both the resonant frequency and the intensity of the level at the resonant frequency may be adjusted and the overall frequency characteristic shape may also be adjusted to a desired shape. Based on the above configuration, it is possible to enhance and improve the overall acoustic performance, such as acoustic performance of a low-frequency band.

In various example embodiments, an electronic device 300 may include: a housing 310 including a first housing 311 facing a first direction, and a second housing 312 facing a second direction opposite to the first direction; a sound module 340 disposed on a surface of the first housing 311 facing the second direction and configured to generate a sound; an acoustic duct 350 formed in the first housing 311 such that the sound module 340 and an outside of the electronic device 300 communicate with each other, and configured to transmit the sound generated by the sound module 340 to the outside of the electronic device 300; and a resonance structure 360 formed in the first housing 311 to communicate with the acoustic duct 350 to tune a resonance characteristic according to a shape of the acoustic duct 350.

In various example embodiments, the resonance structure 360 may include: a resonance space 361 formed in the first housing 311; and an inlet duct 362 formed in the first housing 311 to allow the resonance space 361 to communicate with the acoustic duct 350.

In various example embodiments, the volume of the resonance space 361 may be greater than the volume of the inlet duct 362.

In various embodiments, the cross-sectional area of the resonance space 361 may be greater than the cross-sectional area of the inlet duct 362.

In various example embodiments, the longitudinal length of the resonance space 361 may be greater than the longitudinal length of the inlet duct 362.

In various example embodiments, a resonance characteristic of the acoustic duct 350 may be tuned by adjusting at least one of the volume of the resonance space 361, the cross-sectional area of the inlet duct 362, and the length of the inlet duct 362.

In various example embodiments, the resonance structure 360 may be formed such that at least one surface of the resonance structure 360 may be opened, and the opened surface may be covered by a counterpart structure 370.

In various example embodiments, the counterpart structure 370 may include at least one of a display, a waterproof tape, a film member, an adhesive member, an injection member, and a metal member.

In various example embodiments, at least one of a volume of the resonance space 361 and a cross-sectional area of the inlet duct 362 may be adjusted by forming a stepped portion in the counterpart structure 370.

In various example embodiments, the length of the inlet duct 362 may be adjusted by adjusting the arrangement position of the counterpart structure 370.

In various example embodiments, the resonance structure 360 may be formed inside the first housing 311.

In various example embodiments, the first housing 311 may be segmented into a plurality of portions, and a portion of the first housing 311 in which the resonance structure 360 is formed may function as an antenna.

In various example embodiments, the acoustic duct 350 may be formed on a surface of the first housing 311 facing the first direction.

In various example embodiments, the resonance structure 360 may tune a resonant frequency according to the shape of the acoustic duct 350 to prevent the resonant frequency from overlapping a peak or valley of an equal-loudness contour.

In various example embodiments, the resonance structure 360 may reduce a difference between a level at a resonant frequency of the acoustic duct 350 and a level at F0.

In various example embodiments, an electronic device 300 may include: a housing 310 including a first housing 311 facing a front surface of the electronic device 300, and a second housing 312 facing a rear surface of the electronic device 300; a sound module 340 disposed on a rear surface of the first housing 311 and configured to generate a sound; an acoustic duct 350 formed in the first housing 311 to emit the sound generated by the sound module 340 to the front surface; and a resonance structure 360 formed in the first housing 311 to communicate with the acoustic duct 350 to tune a resonance characteristic according to a shape of the acoustic duct 350.

In various example embodiments, the resonance structure 360 may include: a resonance space 361 formed in the first housing 311; and an inlet duct 362 formed in the first housing 311 to allow the resonance space 361 to communicate with the acoustic duct 350.

In various example embodiments, a resonance characteristic of the acoustic duct 350 may be tuned by adjusting at least one of the volume of the resonance space 361, the cross-sectional area of the inlet duct 362, and the length of the inlet duct 362.

In various example embodiments, the resonance structure 360 may be formed such that at least one surface of the resonance structure 360 may be opened, and the opened surface may be covered by a counterpart structure 370.

In various example embodiments, an electronic device 300 may include: a housing 310 including a first housing 311 facing a first direction, and a second housing 312 facing a second direction opposite to the first direction; a sound module 340 disposed on a surface of the first housing 311 facing the second direction and configured to generate a sound; an acoustic duct 350 formed in the first housing 311 such that the sound module 340 and an outside of the electronic device 300 communicate with each other, and configured to transmit the sound generated by the sound module 340 to the outside of the electronic device 300; and a resonance structure 360 formed in the first housing 311 to communicate with the acoustic duct 350 to tune a resonance characteristic according to a shape of the acoustic duct 350. The resonance structure 360 may include: a resonance space 361 formed in the first housing 311; and an inlet duct 362 formed in the first housing 311 to allow the resonance space 361 to communicate with the acoustic duct 350. The first housing 311 may be segmented into a plurality of portions, and a portion of the first housing 311 in which the resonance structure 360 is formed may function as an antenna. A resonance characteristic of the acoustic duct 350 may be tuned by adjusting at least one of the volume of the resonance space 361, the cross-sectional area of the inlet duct 362, and the length of the inlet duct 362.

Although the present disclosure has been described with various embodiments, various changes and modifications may be suggested to one skilled in the art. It is intended that the present disclosure encompass such changes and modifications as fall within the scope of the appended claims.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   a housing comprising a first housing facing a first direction, and a second housing facing a second direction opposite to the first direction;
   a sound module disposed on a surface of the first housing facing the second direction and configured to generate a sound;
   an acoustic duct formed in the first housing such that the sound module and an outside of the electronic device communicate with each other, the acoustic duct being configured to transmit the sound generated by the sound module to the outside of the electronic device; and
   a resonance structure formed in the first housing to communicate with the acoustic duct, to tune a resonance characteristic according to a shape of the acoustic duct.

2. The electronic device of claim 1, wherein the resonance structure comprises:
   a resonance space formed in the first housing; and
   an inlet duct formed in the first housing to allow the resonance space to communicate with the acoustic duct.

3. The electronic device of claim 2, wherein a volume of the resonance space is greater than a volume of the inlet duct.

4. The electronic device of claim 2, wherein a cross-sectional area of the resonance space is greater than a cross-sectional area of the inlet duct.

5. The electronic device of claim 2, wherein a longitudinal length of the resonance space is greater than a longitudinal length of the inlet duct.

6. The electronic device of claim 2, wherein a resonance characteristic of the acoustic duct is tuned by adjusting at least one of a volume of the resonance space, a cross-sectional area of the inlet duct, and a length of the inlet duct.

7. The electronic device of claim 2, wherein the resonance structure is formed such that at least one surface of the resonance structure is opened, and the opened surface is covered by a counterpart structure.

8. The electronic device of claim 7, wherein the counterpart structure comprises at least one of a display, a waterproof tape, a film member, an adhesive member, an injection member, and a metal member.

9. The electronic device of claim 8, wherein at least one of a volume of the resonance space and a cross-sectional area of the inlet duct is adjusted by forming a stepped portion in the counterpart structure.

10. The electronic device of claim 8, wherein a length of the inlet duct is adjusted by adjusting an arrangement position of the counterpart structure.

11. The electronic device of claim 2, wherein the resonance structure is formed inside the first housing.

12. The electronic device of claim 1, wherein the first housing is segmented into a plurality of portions, and a portion of the first housing in which the resonance structure is formed functions as an antenna.

13. The electronic device of claim 1, wherein the acoustic duct is formed on a surface of the first housing facing the first direction.

14. The electronic device of claim 1, wherein the resonance structure is configured to tune a resonant frequency according to the shape of the acoustic duct to prevent the resonant frequency from overlapping a peak or a valley of an equal-loudness contour.

15. The electronic device of claim 1, wherein the resonance structure is configured to reduce a difference between a level at a resonant frequency of the acoustic duct and a level at F0.

16. An electronic device, comprising:
a housing comprising a first housing facing a front surface of the electronic device, and a second housing facing a rear surface of the electronic device;
a sound module disposed on a rear surface of the first housing and configured to generate a sound;
an acoustic duct formed in the first housing to emit the sound generated by the sound module to the front surface; and
a resonance structure formed in the first housing to communicate with the acoustic duct, to tune a resonance characteristic according to a shape of the acoustic duct.

17. The electronic device of claim 16, wherein the resonance structure comprises:
a resonance space formed in the first housing; and
an inlet duct formed in the first housing to allow the resonance space to communicate with the acoustic duct.

18. The electronic device of claim 17, wherein a resonance characteristic of the acoustic duct is tuned by adjusting at least one of a volume of the resonance space, a cross-sectional area of the inlet duct, and a length of the inlet duct.

19. The electronic device of claim 16, wherein the resonance structure is formed such that at least one surface of the resonance structure is opened, and the opened surface is covered by a counterpart structure.

20. An electronic device, comprising:
a housing comprising a first housing facing a first direction, and a second housing facing a second direction opposite to the first direction;
a sound module disposed on a surface of the first housing facing the second direction and configured to generate a sound;
an acoustic duct formed in the first housing such that the sound module and an outside of the electronic device communicate with each other, the acoustic duct being configured to transmit the sound generated by the sound module to the outside of the electronic device; and
a resonance structure formed in the first housing to communicate with the acoustic duct, to tune a resonance characteristic according to a shape of the acoustic duct,
the resonance structure comprising:
a resonance space formed in the first housing; and
an inlet duct formed in the first housing to allow the resonance space to communicate with the acoustic duct,
wherein the first housing is segmented into a plurality of portions,
wherein a portion of the first housing in which the resonance structure is formed functions as an antenna, and
wherein a resonance characteristic of the acoustic duct is tuned by adjusting at least one of a volume of the resonance space, a cross-sectional area of the inlet duct, and a length of the inlet duct.

* * * * *